United States Patent
Blard et al.

[11] Patent Number: 6,152,274
[45] Date of Patent: *Nov. 28, 2000

[54] CLUTCH MECHANISM FOR FRICTION CLUTCH WITH LOW DECLUTCHING FORCE, IN PARTICULAR FOR MOTOR VEHICLES

[75] Inventors: Michel Blard, Issy les Moulineaux; Hugues Minereau, Stains, both of France

[73] Assignee: Valeo, Paris, France

[ * ] Notice: This patent is subject to a terminal disclaimer.

[21] Appl. No.: 09/194,870
[22] PCT Filed: Apr. 7, 1998
[86] PCT No.: PCT/FR98/00699
   § 371 Date: Dec. 4, 1998
   § 102(e) Date: Dec. 4, 1998
[87] PCT Pub. No.: WO98/45612
   PCT Pub. Date: Oct. 15, 1998

[30] Foreign Application Priority Data

Apr. 7, 1997 [FR] France .................................. 97 04214

[51] Int. Cl.[7] ...................................................... F16D 13/54
[52] U.S. Cl. ..................................... 192/70.25; 192/70.27; 192/111 A; 192/89.23
[58] Field of Search ............................... 192/70.25, 70.27, 192/111 A, 89.23

[56] References Cited

U.S. PATENT DOCUMENTS

| | | | |
|---|---|---|---|
| 4,949,829 | 8/1990 | Tojima et al. | 192/89 B |
| 5,730,267 | 3/1998 | Lopez | 192/70.27 |
| 5,816,379 | 10/1998 | De Briel et al. | 192/70.25 |
| 5,855,267 | 1/1999 | Giroire et al. | 192/70.27 |

FOREIGN PATENT DOCUMENTS

| | | |
|---|---|---|
| 2719159 | 3/1997 | France . |
| 4311286 | 10/1993 | Germany . |
| 943039 | 11/1963 | United Kingdom . |
| 9810201 | 3/1998 | WIPO . |

*Primary Examiner*—Charles A Marmor
*Assistant Examiner*—Tisha D. Waddell
*Attorney, Agent, or Firm*—Liniak, Berenato, Longacre & White

[57] ABSTRACT

A clutch mechanism, in particular for motor vehicles, comprising a cover (8) with a base (80), a clutch thrust plate (3) with front friction surface (30) co-operating with a clutch friction (2), and, set between the clutch thrust plate (3) and the cover (8) base (80), resilient clutch means with axial action (4, 6) axially stressing the clutch thrust plate in a direction opposite to the cover (8) base (80) and a declutching device (7) to counter at will the action of the resilient clutch means (4, 6): the resilient clutch means (4, 6) comprise two Belleville washers (4, 6) series-mounted between the clutch thrust plate (3) and the cover (8), the mechanism being equipped with a wear take-up device (90) for at least the clutch friction linings (2) actuated by the resilient clutch means (4, 6); the wear take-up device (90) comprises ramp means (111) arranged at its circumference and support zones (114), one (4) of the Belleville washers (4, 6) being in contact with the support zones (114), while the other (6) rests on the cover (8).

14 Claims, 1 Drawing Sheet

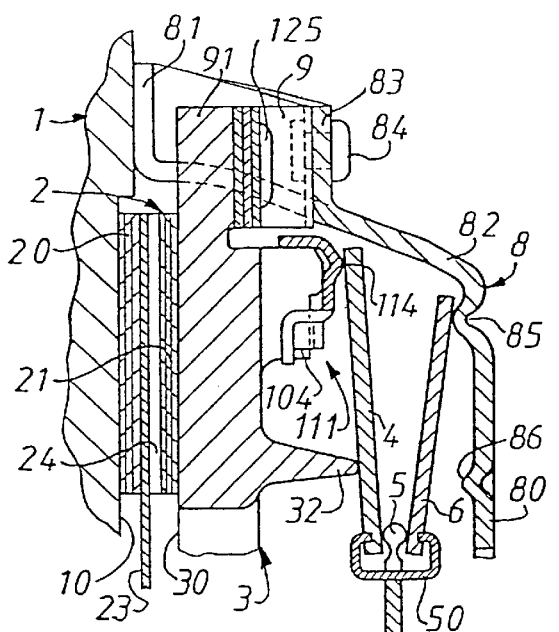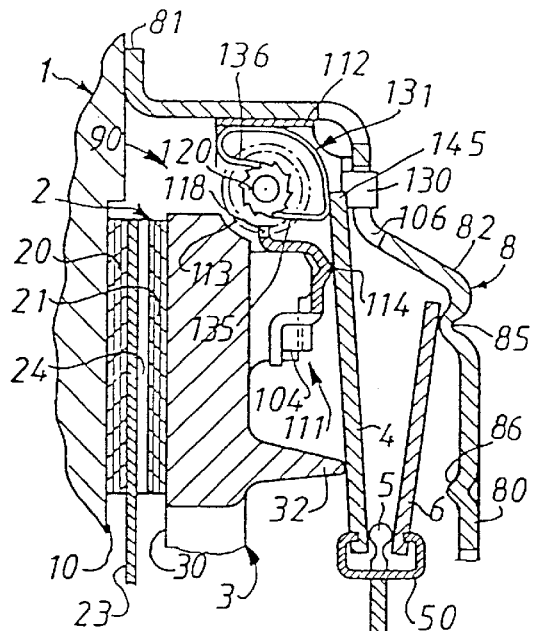
FIG.1    FIG.2
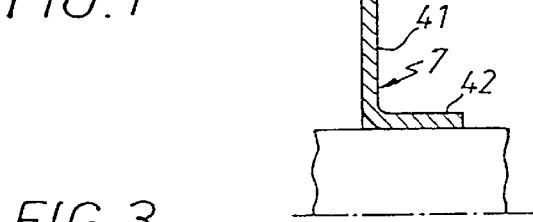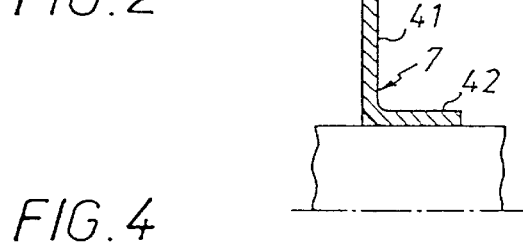
FIG.3    FIG.4

CLUTCH MECHANISM FOR FRICTION CLUTCH WITH LOW DECLUTCHING FORCE, IN PARTICULAR FOR MOTOR VEHICLES

BACKGROUND OF THE INVENTION

1. Field of the Invention

The present invention concerns friction clutches with low disengagement force, notably for motor vehicles, and relates more particularly to the engagement mechanism in such a clutch.

2. Description of Related Art

As is known, in a conventional clutch interposed between a driving shaft and a driven shaft, a diaphragm bears on the base of a cover, fixed to a flywheel for driving in rotation, in order to move a thrust plate in the direction of the flywheel, forming a reaction plate, in order to clamp the friction linings of a clutch friction device between the thrust and reaction plates.

The driving flywheel is fixed with respect to rotation to a first shaft, such as a driving shaft, whilst the clutch friction device has at its internal periphery a hub for fixing it with respect to rotation to a second shaft, such as a driven shaft.

The clutch is therefore normally engaged, with torque transmission between the driving and driven shafts.

In order to disengage, or declutch, the clutch, it is necessary, using a clutch release bearing, to act axially by pushing, in the case of a clutch of the pushed type, on the internal end of the diaphragm fingers in order to pivot the diaphragm and cancel out the force exerted by this diaphragm on the axially movable thrust plate in order to release the friction linings. The torque is then no longer transmitted from the driving shaft to the driven shaft, since the friction linings are no longer clamped between the thrust and reaction plates fixed with respect to rotation to the hollow-shaped cover.

Normally, the cover, thrust plate and diaphragm form a unitary assembly referred to as the clutch mechanism, which is attached by its cover to the flywheel, elastic tongues rotatably connecting, with axial mobility, the thrust plate to the cover.

The diaphragm, as is known, has a central hole and an external peripheral part in the form of a Belleville washer extended inwards by a central part divided into radial fingers by slots. This diaphragm, through its Belleville washer part, bears on the cover and on the thrust plate. Thus the disengagement device of the clutch, which makes it possible to counteract at will the action of the elastic engagement means, consists of the fingers of the diaphragm on the internal end of which the clutch release bearing acts, whilst the Belleville washer of the diaphragm constitutes elastic axially acting engagement means for clamping the friction linings between the thrust and reaction plates and therefore to axially force the thrust plate in the opposite direction to the base of the cover.

In the free state, this diaphragm has a frustoconical shape. Once mounted in the clutch, its Belleville washer is mounted under prestress and is more or less flattened. During the operation of declutching, or disengaging, the clutch, the conicity of its Belleville washer is modified.

As is known, the characteristic curve of this diaphragm, which represents the force exerted according to the disengagement travel, for example returned to the level of the inner end of the diaphragm fingers, is determined by the dimensions of its Belleville washer, notably by the ratio between the height of the truncated cone of the Belleville washer in the free state and the thickness of the diaphragm.

This characteristic curve passes through a maximum.

Thus the force to be exerted on the internal end of the diaphragm fingers, during the disengagement operation, increases up to a maximum, decreases gradually to a minimum, and then increases once again.

The difference between the maximum and the minimum can be great. For more information on this characteristic curve, reference should be made for example to the document FR-A-1 392 569 or to the document WO-97/19 275.

In the document FR-A-1 392 569, provision is made for an elastic progressive-action device for avoiding passing through the aforementioned maximum during the disengagement travel. This device is mounted in series with the Belleville washer of the diaphragm and has an elastic force which is appreciably less than that of the Belleville washer. This device has a limited travel between a prestressing position where its force is at a maximum and a stressing position where its force is at a minimum.

With this arrangement an overall increasing disengagement force is obtained at the clutch release bearing.

It is not possible to obtain, during the disengagement travel, an assistance which is as great as desired, the progressive-action device reducing the load exerted by the diaphragm on the thrust plate during this engagement.

The load curves of the progressive-action device and of the diaphragm have shapes which do not make it possible to combine them in order to obtain strong assistance with disengagement, particularly if it is wished to comply with the disengagement travels and forces compatible with the actual disengagement commands. Moreover, the shape of the curve of the progressive-action device changes very rapidly with the life of the clutch, and the higher the assistance level required, the more this cancels out the disengagement assistance. In order to prevent aging of the curve of the assistance device, it is preferably to place this at a point where its stiffness curve will remain stable over time and, in particular, at a place positioned outside the progressive-action area of the friction device where the lining contact and the phenomenon of incrustation change and cause the progressive-action curve to change.

Thought can then be given to causing an assistance spring to act in parallel with the diaphragm. In this case, the assistance spring, for example in the form of a Belleville washer, can bear on the cover and on the inner end of the diaphragm fingers.

In the clutch engaged position, it can then exert a minimum force, and then, its conicity varying, exert an assistance force during the disengagement operation. It is therefore necessary for this assistance force to be at a minimum in the clutch-engaged position throughout the life of the clutch.

The idea for this type of design is to have recourse to an adjustment device, referred to as a wear take-up device, which always holds the diaphragm roughly in the same position, whatever the wear on the friction linings of the clutch and/or the friction faces of the thrust and reaction plates, so that the assistance spring exerts, in all circumstances during the life of the clutch, a very low force when the clutch is in the engaged position.

In the certificate of addition 86 983 to French patent 1 392 569, it has already been proposed to interpose, between the elastic washer of the diaphragm and the thrust plate, an auxiliary elastic washer, the two elastic washers being placed in series. The auxiliary elastic washer affords a certain degree of progressive action of the engagement of the clutch and procures a certain amount of assistance force during its disengagement.

SUMMARY OF THE INVENTION

The object of the present invention is to create, simply and economically, a friction clutch with a low disengagement force having recourse also to springs acting in series without appreciably decreasing, throughout the life of the clutch, the clamping force of the friction linings in the clutch-engaged state, by virtue of the presence of a wear take-up device.

Thus, according to the invention, an engagement mechanism for a friction clutch, notably for motor vehicles, having a hollow-shaped cover with a transversally oriented base and fixing means for fixing the engagement mechanism to a flywheel driving in rotation, a thrust plate having at the front a friction face for cooperation with a clutch friction device, elastic tongues for connecting in rotation, with axial mobility, the thrust plate with the cover. Interposed between the rear face of the thrust plate and the base of the cover, on the one hand is elastically acting engagement means axially forcing the thrust plate in the opposite direction to the base of the cover and on the other hand is a disengagement device for counteracting at will the action of the said elastic engagement means. The mechanism is characterised by the fact that the elastic engagement means have two Belleville washers mounted in series between the thrust plate and the cover, the washers being inclined in opposite directions. The mechanism is equipped with a wear take-up device for at least the clutch friction linings actuated by the elastic engagement means, the wear take-up device having ramp means having ramps disposed circumferentially and bearing areas. One of the Belleville washers, referred to as the first Belleville washer, is in contact with the bearing areas, whilst the other one of the Belleville washers, referred to as the second Belleville washer, bears on the cover.

Advantageously, the first washer is in contact through its external periphery with the bearing areas whilst the second washer bears through its external periphery on the cover. Force transmission means are interposed between the internal peripheries of the first and second Belleville washers, the force transmission means being carried by the disengagement device.

As a variant, the first washer is contact through its middle part with the bearing areas whilst the second washer bears through its internal periphery on the cover.

As a variant, the first washer is in contact through its internal periphery with the bearing areas whilst the second washer bears through its internal periphery on the cover.

Advantageously, the wear take-up device is actuated by the first Belleville washer.

Preferably, the base of the cover carries an abutment for limiting the inclination of the second Belleville washer.

In the case of the variants in which the second washer bears on the cover through its internal periphery, advantageously the wear take-up device is actuated by the second Belleville washer; preferably, the second elastic washer is the external peripheral part of a diaphragm extended inwards by a central part divided into radial fingers by slots.

Also with regard to the above variants, preferably force transmission means are interposed between the external peripheries of the first and second Belleville washers; the wear take-up device is actuated by the force transmission means.

Advantageously, having regard to the presence of the elastic progressive-action means interposed between the friction linings and the clutch friction device, the second Belleville washer is chosen for exerting a preponderant action with respect to the first Belleville washer; the stiffness of the second Belleville washer is greater than the stiffness of the first Belleville washer.

Preferably, the second Belleville washer develops a maximum load greater in absolute value than that developed by the first Belleville washer.

Preferably, as described in the document WO 97/19275 (FIG. 4), the Belleville washer, which acts on the wear take-up device, is a negative Belleville washer; the load which it supplies decreasing when the height of its truncated cone decreases and then increases—whilst the other Belleville washer is a positive washer; the load which it supplies increasing when the height of its truncated cone decreases.

The positive washer, forming an assistance washer, is therefore used between the origin and the maximum of the characteristic curve of a Belleville washer and the negative Belleville washer, forming a clamping washer, beyond the said maximum.

BRIEF DESCRIPTION OF THE DRAWINGS

The following description illustrates the invention with regard to the accompanying drawings, in which:

FIG. 1 is a half-view in axial section of a clutch according to the invention in the clutch engaged position;

FIG. 2 is a half-view in axial section of the clutch of FIG. 1 showing the wear take-up device with which it is equipped;

FIG. 3 is a half-view in axial section showing a variant clutch according to the invention;

FIG. 4 is a half-view in axial section showing yet another variant clutch according to the invention.

DETAILED DESCRIPTION OF PREFERRED EMBODIMENTS

The clutch depicted in FIG. 1 has a set of annular-shaped parts, namely, in succession axially, a flywheel 1 driving in rotation for fixing the clutch to a first shaft, such as a driving shaft, a clutch friction device 2 having at its external periphery friction linings 20, 21 and at its internal periphery a hub, not shown, for rotatably connecting the clutch with a second shaft such as a driven shaft, a thrust plate 3, a first Belleville washer 4, a bearing spring ring 5, a second Belleville washer 6 inclined in the opposite direction with respect to the first Belleville washer 4, a declutching device 7, a hollow-shaped cover 8 having a roughly transversely oriented base 80 with a central hole and, at its external periphery, fixing means 81 for fixing the cover 8 to the flywheel 1 forming a reaction plate.

The flywheel 1 has at its rear a friction face 10 and is depicted here partially, knowing that, in a known fashion, it has centrally holes for fixing it to the driving shaft by means of screws. Here the flywheel 1 is made in a single piece whilst being of castable material just like the thrust plate 3, which has at its front a friction face 30 opposite the friction face 10 of the flywheel 1.

The flywheel 1 and thrust plate 3 are here made of cast iron.

The clutch friction device 2 also has a support disc 23 for carrying the friction linings 20, 21, possibly divided. These linings 20, 21 extend on each side of the support disc 23 whilst being fixed to it f or example by riveting. Here, the linings 20, 21 are fixed by bonding or brazing to the metallic support disc 23.

In a known fashion, elastic axially acting progressive-action means 24 are interposed between the two linings 20, 21 for progressive clamping thereof between the flywheel 1 and thrust plate 3. These means can have any suitable shape. Here, these means 24 are produced by shaping the support disc 23. This disc, non-limitatively, can have a central part for connecting it, in an elastic fashion or not, to the hub, and a peripheral part divided into radial blades, for example of the tripod type. Each blade then has a central bearing area intended for fixing one of the friction linings 20, 21 and two external peripheral bearing areas intended to cooperate with the other one of the friction linings 20, 21.

The bearing areas are offset axially with respect to the central part of the disc 23, the central bearing area, of large extent, being connected to the central part by a tangential fold, whilst the peripheral bearing areas are connected to the central bearing area by oblique folds. For more information, reference should be made to the document U.S. Pat. No. 5,452,783, also showing an embodiment with friction linings divided into pads. The friction linings can be fixed by riveting and/or bonding to the central bearing areas.

As mentioned above, the disc 23 can be coupled elastically to the hub. As a variant, the disc 23 is coupled rigidly to the hub, the flywheel 1 then being divided in order to have two masses coupled elastically to each other by circumferentially or radially acting springs.

As a variant, the flywheel 1 can be in two parts and have a support flange fixed at its internal periphery to the driving shaft and at its external periphery to a reaction plate having the friction face 10. The cover 8 can then be connected to the flywheel 1 in two parts by means of axially oriented lugs issuing from its cylindrical peripheral skirt 82. These lugs, in the form of tenons, are then engaged in mortises formed at the external periphery of the reaction plate or of the support flange. The free portion of the lugs, forming the aforementioned fixing means 81 for the cover 8, can be fixed, by crimping, folding over or welding, to the flange or to the reaction plate, as described for example in French patent application 95/12523 filed on Oct. 24, 1995.

Here, the cover 8 has a conventional form and the fixing means 81 consist of a radial edge on the cover 8, directed radially in the opposite direction to the axial symmetry axis of the clutch, the edge 81 being provided with holes, not visible, for mounting members for fixing the edge 81 to the flywheel 1, such as screws or, as a variant, rivets.

With regard to an application for a motor vehicle, the driving shaft is here the driving shaft of the vehicle, to the crankshaft of which the flywheel I is fixed, whilst the driven shaft consists of the gearbox input shaft.

Naturally, it is possible to reverse the structures, the first shaft being able to be the driven shaft and the second shaft a driving shaft.

In this figure, the thrust plate 3 is connected with respect to rotation with the cover 8 by elastic tongues 9 enabling the thrust plate 3 to move axially with respect to the cover 8. The thrust plate 3 is therefore fixed with respect to rotation to the cover 8 and flywheel 1, whilst being axially movable with respect to these.

The tongues 9 are here tangentially oriented and force the thrust plate 3 in the direction of the base 80 of the cover. These elastic tongues 9 are therefore axially acting and have a return action. As a variant, the tongues can be radially oriented.

Here, the external cylindrical skirt 82 of the cover 8, connecting the base 80 to the radial fixing edge 81, has holes locally for the passage of lugs 91, which the thrust plate 3 has in radial projection. The tangential tongues 9 are fixed at one of their ends to the lugs 91 and at their other end to a radial area 83 on the cover. These tongues 9 are distributed regularly on the circumference, in a known fashion; their number, like that of the lugs 91, depends on the application, knowing that, for private cars, recourse is generally had to three tongues 9 or groups of tongues.

These tongues 9 are fixed to the areas 83 and to the lugs 91 by means of fixing members 84, usually rivets, or as a variant screws or bolts. Here, the rivet 84 associated with the lug 91 cannot be seen, since the latter is circumferentially broad for fixing a return hook, not shown, coupling the first Belleville washer 4 to the thrust plate 3; the said hooks (one per lug 91) are fixed by means of rivets 125, or as a variant screws or bolts.

The first Belleville washer 4 bears at its external periphery on the thrust plate 3, as described below.

This washer 4 is inclined, in the direction of the cover 8, its concavity being directed towards the thrust plate 3.

The second Belleville washer 6 bears at its external periphery on a dished part 85, divided or not, formed in the base 80 of the cover 8 and directed axially towards the thrust plate 3. The second Belleville washer 6 is inclined in the direction of the thrust plate 3, in the opposite direction to the first washer 4, its concavity being directed towards the base 80 of the cover 8.

The two Belleville washers 4 and 6 thus have in section a V shape whilst being in contact at their internal periphery with an annular force-transmission spring ring 5 interposed between them.

Advantageously, the washers 4 and 6 are hollowed locally for receiving the spring ring 5. The external face of these washers 4 and 6 is grooved in order to hold a U-shaped clamp 50 on which the free ends of the legs are axially oriented. The clamp 50 extends through its base radially below the washers 4 and 6.

The clamp 50, here annular in shape, is elastic and elastically clamps the washers 4 and 6 in contact with the spring ring 5 whilst being in contact through its legs with the external face of the said washers. This clamp can as a variant be divided into clips. According to the inclination of the washers 4 and 6, the clamp opens or close.

The disengagement device 7 comprises a transverse plate 41 bearing at its external periphery the annular force-transmission spring ring 5; the transverse plate 41 is connected by its internal periphery to a sleeve 42 mounted so as to slide axially.

This disengagement means 7 is designed to counteract and overcome at will the elastic action of the Belleville washers 4 and 6 with a view to releasing at will the friction linings 20, 21 and the clutch friction device 2 from between the thrust plate 3 and reaction plate 1 in order to disengage the clutch.

The Belleville washers 4 and 6 make it possible to clamp the said linings 20, 21 between the plates 1 and 3 and constitute the axially acting engagement means forcing the thrust plate in the opposite direction to the base 80 of the cover 8.

The sleeve 42 of the disengagement device 7 can be moved, with a view to the disengagement operation, in one direction or the other, that is to say in the direction of the arrow F, the clutch being of the pulled type, or in the opposite direction to that of the arrow F, the clutch being of the pushed type: this depends on the choice of the relative characteristics of the first 4 and second 6 Belleville washers.

More precisely, under the conditions described below, one of the Belleville washers provides the clamping of the clutch and is designated below as the clamping washer; the other Belleville washer affords assistance for the disengagement and is designated below as the assistance washer.

The clamping washer, like the Belleville washer part of a diaphragm, is such that the load which it affords increases with the height of the truncated cone which it represents. The assistance washer is such that the load which it procures, whilst of course being less than that procured by the clamping washer, decreases with the height of its truncated cone. The two washers working in the area of their characteristic curve with practically linear crushing load, it can be seen that, by choosing washers whose curves are, in these areas, practically parallel, the disengagement force, which at each position of the disengagement device is equal, or proportional, to the difference between the loads of the washers, is low and practically constant. As a variant, if the stiffness of the clamping washer is greater than that of the assistance washer, a clamping force can be obtained which is low but increasing slightly with the disengagement travel. These characteristic curves must of course take account of the existence, when such exists, of the force due to the elastic progressive-action means 24 of the friction device 2, and theoretically of the force due to the elastic tongues 9, but this is negligible, these forces, as is known, acting in the direction of the disengagement and participating in assistance for disengagement. For more information, reference should be made to the document WO 97/19275 (FIG. 4).

FIG. 1 shows the case of a pulled clutch, that is to say the disengagement is obtained by acting, at the sleeve 42, in the direction of the arrow F; the second Belleville washer 6 is here the assistance washer and the first washer 4 is the clamping washer.

In FIG. 1, the clutch is shown engaged under the load of the second Belleville washer 6, the assistance washer, transmitted to the thrust plate 3, via the force transmission means 5, here in the form of a spring ring, by the first Belleville washer 4 for clamping in abutment through its external periphery on the abutment areas 114 described below and through its internal periphery on the annular stop 32.

During an action on the sleeve 42 in the direction of the arrow F, the washer 6 is to a certain extent compressed, its load exerted increasing and its internal periphery being brought closer to the base 80 of the cover 8; this compression is assisted by the clamping washer 4, which releases the stored energy, in the engaged position, under the effect of the washer 6, which is preponderant, during the engagement operation. The compression travel of the washer 6 is limited at the level of the disengagement device 7 or, as depicted, by a dished part 86 in the base 80 of the cover with which the washer 6 comes to cooperate at the end of the disengagement operation.

It will easily be understood that, in order to produce a clutch of the pushed type, that is to say in which the disengagement operation is obtained by acting on the sleeve 42 in the reverse direction to that of the arrow F, it suffices to exchange the characteristics of the washers 4 and 6. According to this variant, therefore, not shown, the first Belleville washer 4 is the assistance washer and the second Belleville washer 6 is the clamping washer. Here, in the engaged position, the washer 4 is at a distance from the annular stop 32 and the washer 6 is in abutment at the same time on the dished parts 85 and 86 of the base 80 of the cover 8. The annular stop 32 here fulfils the role of disengagement travel limitation.

In order to ensure perfect consistency of the clamping force, the engagement mechanism is equipped with a wear take-up device such as the device 90 shown in FIG. 2; the device 90 was described in detail in the French patent application filed on Sep. 17, 1996 under the number 96 11 297, to which reference should be made for more information, the corresponding description having to be considered as forming part of the present application; its constitution will simply be restated.

The wear take-up device 90 comprises circumferentially disposed ramp means 111 consisting of a ring made of sheet metal cut out and pressed so as to have ramps disposed circumferentially. The ring also has bearing areas 114 consisting of the top rounded edge of dished parts in the shape of arcs of a circle centered on the axis of the clutch and here placed radially towards the outside with respect to the ramps. The thrust plate 3 has, here cast in one piece, its face turned towards the base of the cover 8, studs 104 distributed circumferentially at a distance from each other which corresponds to that which circumferentially separates two successive ramps, the studs 104 each being intended to cooperate with a ramp.

The ramp means 111 are placed axially between the first washer 4 and the thrust plate 3 so that the studs 104 receive the ramps and the first washer 4 cooperates with the bearing areas 114, which thus constitute the bearing means by means of which the washers 4 and 6 act on the thrust plate 3.

One of the bearing areas 114 of the ramp means ill is extended at its external periphery by an edge parallel to the axis of the clutch ending in a transverse return, that is to say extending in a plane perpendicular to the axis of the clutch, provided at its periphery with teeth 118.

The wear take-up device 90 also comprises a ratchet wheel 120 with inclined teeth fixed to a shaft which also carries a worm 113; the thread and pitch of the worm 113 are adapted to the teeth 118 on the ramp means 111.

The shaft of the ratchet wheel 120 is carried rotatably by a support 112, made of cut and bent sheet metal, in the shape of a U having a web and two flanges intended to support the shaft.

The support 112 is extended externally in L-shaped arms each ending in a C-shaped end 130 by means of which the support 112 is fixed to the cover by crimping to the edges of a transverse opening 106 formed in the transverse wall of the cover 2.

The support 112 is adapted to receive an elastic member 131 in the general form of a tie bar, each end of which is provided with an inward return; more precisely, the longest part of the tie bar carries at its end a control tongue 135; the shortest part of the tie bar has a return 136, referred to as a non-return latch, which extends roughly parallel to the control tongue 135 whilst being at a distance from it so that, when the elastic member 131 and the ratchet wheel 120 are mounted in the support 112, the non-return latch 136 and control tongue 135 each cooperate with a tooth root, the two teeth concerned here being practically diametrically opposed.

A helical compression spring is placed between the ratchet wheel 120 and a support arm 112, whilst being coiled around the shaft; the worm 13 and ratchet wheel 20 are cut from the same piece.

The helical spring constitutes the elastic take-up means. The ratchet wheel 120 is in line with the non-return latch 136 which, by cooperation with the inclined teeth 121 of the ratchet wheel 120, prevents the ratchet wheel 120, as well as the worm 113, from turning in the anti-clockwise direction as seen in the figure.

The support 112, carrying the ratchet wheel 120, the worm 113 and the helical spring, being fixed to the cover 8, the first washer 4 moves with respect to it during the disengagement and re-engagement operation. The first washer 4 carries at its periphery a radial appendage referred to as an actuator 145 extending radially outwards in order to cooperate with the elastic member 131. It will be understood that, by virtue of this arrangement, when the first washer 4 tilts during disengagement and re-engagement operations, the actuator 145 moves, from right to left as seen in FIG. 2, the control tongue 135 which, by cooperation with the teeth 121 on the ratchet wheel 120, is caused to make the ratchet wheel 120 turn in the clockwise direction. When the actuator 145, in return, is moved towards the right, the elasticity of the tongue 135 of the elastic member 131 and the inclination of the teeth 121 mean that this tongue 135 moves towards the right by climbing the teeth 121, which are kept fixed with respect to rotation by the non-return latch 136.

The wear take-up device which has just been briefly described functions as explained in the application cited above; by virtue of the take-up device 90, the two washers 4 and 6 keep the same position, in the engaged position, whatever the wear on the linings 20, 21.

According to the variant in FIG. 3, the second elastic washer 6 is the external peripheral part of a diaphragm 206 extended inwards by a central part 207 divided into radial fingers; the diaphragm 206 is mounted articulated on the cover 8 in a conventional fashion by virtue of small columns 208, the clutch here being of the pushed type.

In FIG. 3, the components or parts of components identical to, or fulfilling the same role as, those in the previous variant bear the same references.

Here it is the second Belleville washer 6 which carries the actuator 145, in the form of a radial appendage, in order to actuate the control tongue 135 of the elastic member 131 of the wear take-up device 90. Here, the non-return latch 136 and the tongue 135 are disposed roughly at right angles; the support 112 and elastic member 131 are fixed to the cover 8 by rivets 200.

Here, the first washer 4 and the second washer 6 are inclined in the opposite direction with respect to the variant in FIGS. 1 and 2 and therefore bear on each other through their external periphery. It is in the vicinity of the middle part that the first washer 4 cooperates with the bearing areas 114 of the sheet-metal ring of the ramp means 111. Here the ring has a cylindrical axial edge 214 directed towards the base of the cover 8 and centering the first washer 4 by means of the internal periphery thereof. The transverse flank 232 bordered on the one hand by the bearing areas 114 and on the other hand by the axial edge 214 limits the tilting of the first washer 4 during disengagement. Here the second washer 6 is the clamping washer and the first washer 4 the assistance washer.

According to the variant depicted in FIG. 4, the second washer is also, as in the variant in FIG. 3, formed by the external peripheral part of a diaphragm extended inwards by a central part divided into radial fingers by slots, and the clutch is of the pushed type.

Compared with the variant in FIG. 3, here force transmission means 305 are provided and include an annular cylindrical skirt 306 to which there is attached internally a spring ring 307 interposed between the washers 4 and 6 at their external periphery. The skirt 306 centers the first washer 4 with respect to the second washer 6, itself positioned by the diaphragm to which it belongs, the diaphragm being positioned conventionally by virtue of small columns fixed to the cover, and not visible in the figure.

Here it is the skirt 306 which, at its external part on the cover side, carries the actuator 345, in the form of a radial appendage, in order to actuate the control tongue 135 of the elastic member 131 of the wear take-up device.

Here the sheet-metal ring of the ramp means 111, which carries the teeth 118, is centered at its internal periphery by a cylindrical step 303 formed in the thrust plate 3. The ring has, towards its internal periphery on the cover side, the bearing areas 114 with which the first washer 4 cooperates through its internal periphery.

Naturally, the wear take-up device can have another form, for example of the type described in the document FR-A-2 424 442, the actuator then acting on a drum actuating the worm.

What is claimed is:

1. Engagement mechanism for a friction clutch, having a hollow-shaped cover (8) with a transversally oriented base (80) and fixing means (81) for fixing the engagement mechanism to a flywheel (1) driving in rotation, a thrust plate (3) having at a front a friction face (30) for cooperation with a clutch friction device (2), elastic tongues (9) for connecting in rotation, with axial mobility, the thrust plate (3) with the cover (8), and, interposed between a rear face (36) of the thrust plate (3) and the base (80) of the cover (8), on the one hand elastically acting engagement means (4, 6) axially forcing the thrust plate (8) in an opposite direction to the base (80) of the cover (8) and on the other hand a disengagement device (7) for counteracting at will an action of said elastic engagement means (4, 6), wherein said elastic engagement means (4, 6) have two Belleville washers (4, 6) mounted in series between the thrust plate (3) and the cover (8), said washers (4, 6) being inclined in opposite directions, the mechanism being equipped with a wear take-up device (90) for at least the clutch friction linings (2) actuated by the elastic engagement means (4, 6), the said wear take-up device (90) having ramp means (111) with ramps disposed circumferentially and bearing areas (114), one (4) of the Belleville washers (4, 6), referred to as the first Belleville washer, being in contact with the bearing areas (114), whilst the other one (6) of the Belleville washers (4, 6), referred to as the second Belleville washer, bears on the cover (8).

2. Mechanism according to claim 1, wherein the first washer (4) is in contact through its external periphery with the bearing areas (114) whilst the second washer bears through its external periphery on the cover (8).

3. Mechanism according to claim 2, wherein force transmission means (5) are interposed between the internal peripheries of the first (4) and second (6) Belleville washers, the force transmission means (5) being carried by the disengagement device (7).

4. Mechanism according to claim 1, wherein the first washer (4) is in contact through its middle part with the bearing areas (114) whilst the second washer (6) bears through its internal periphery on the cover (8).

5. Mechanism according to claim 1, wherein that the first washer (4) is in contact through its internal periphery with the bearing areas (114) whilst the second washer (6) bears through its internal periphery on the cover (8).

6. Mechanism according to claim 1, wherein the wear take-up device (90) is actuated by the first Belleville washer (4).

7. Mechanism according to claim 1, wherein the base (80) of the cover (8) carries a stop (86) for limiting the inclination of the second Belleville washer (6).

8. Mechanism according to claim 4, wherein the wear take-up device (90) is actuated by the second Belleville washer (6).

9. Mechanism according to claim 8, wherein the second elastic washer (6) is the external peripheral part of a diaphragm (206) extended inwards by a central part (207) divided into radial fingers by slots.

10. Mechanism according to claim 9, wherein force transmission means (305) are interposed between the external peripheries of the first (4) and second (6) Belleville washers.

11. Mechanism according to claim 10, wherein the wear take-up device is actuated by the force transmission means (305).

12. Mechanism according to claim 1, wherein the second Belleville washer (6) is chosen so as to exert a preponderant action with respect to the first Belleville washer (4).

13. Mechanism according to claim 12, wherein the stiffness of the second Belleville washer (6) is greater than the stiffness of the first Belleville washer (4).

14. Mechanism according to claim 13, wherein the second Belleville washer (6) develops a maximum load greater in absolute value than that developed by the first Belleville washer (4).

* * * * *